M. VON RECKLINGHAUSEN.
APPARATUS FOR THE STERILIZATION OF LIQUIDS BY ULTRA-VIOLET RAYS.
APPLICATION FILED JAN. 15, 1914.

1,190,609.

Patented July 11, 1916.

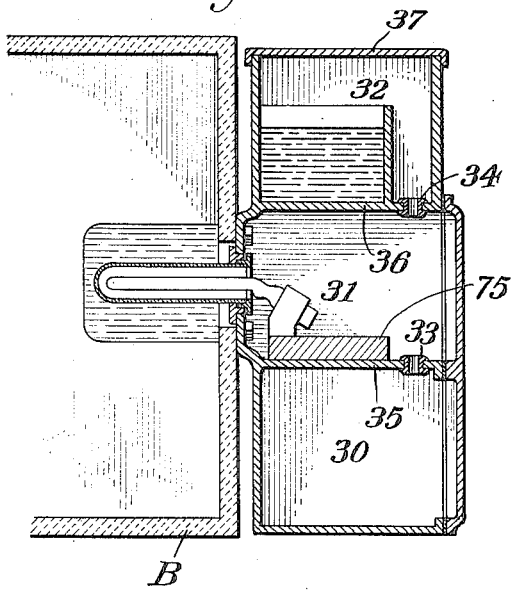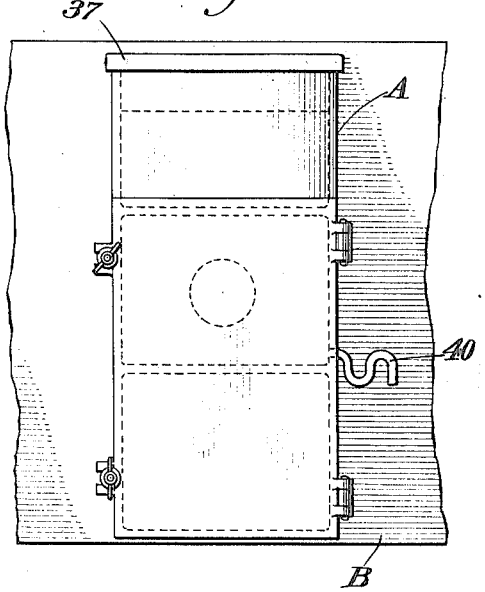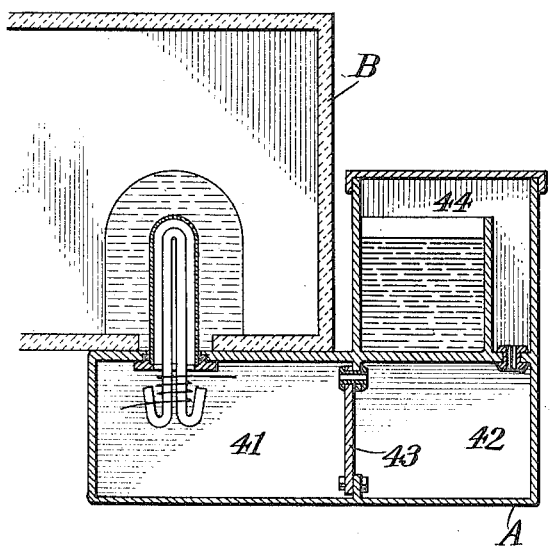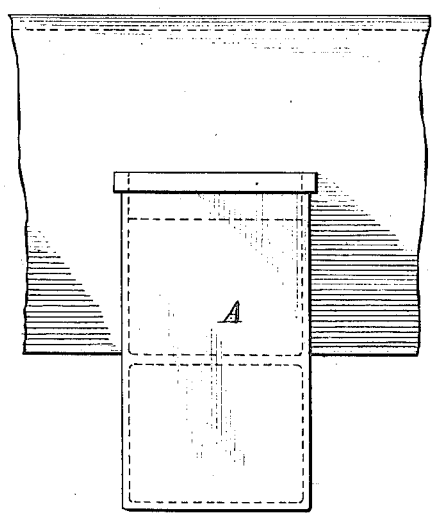

M. VON RECKLINGHAUSEN.
APPARATUS FOR THE STERILIZATION OF LIQUIDS BY ULTRA-VIOLET RAYS.
APPLICATION FILED JAN. 15, 1914.
1,190,609.
Patented July 11, 1916.
4 SHEETS—SHEET 4.
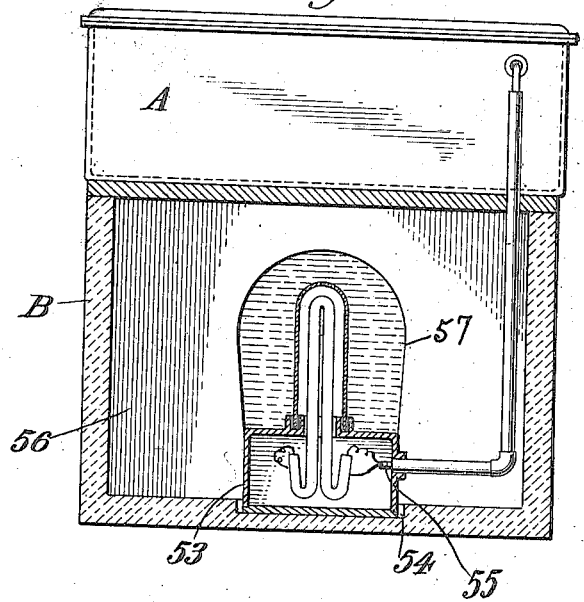
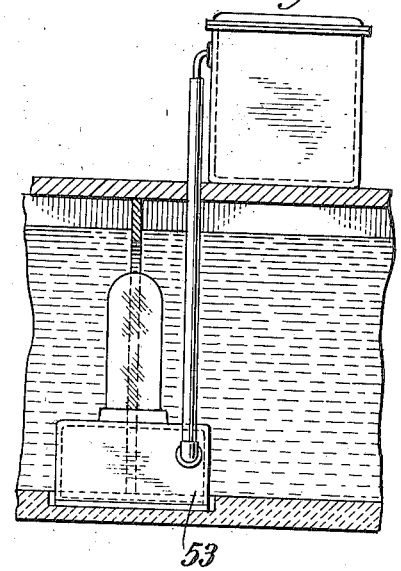
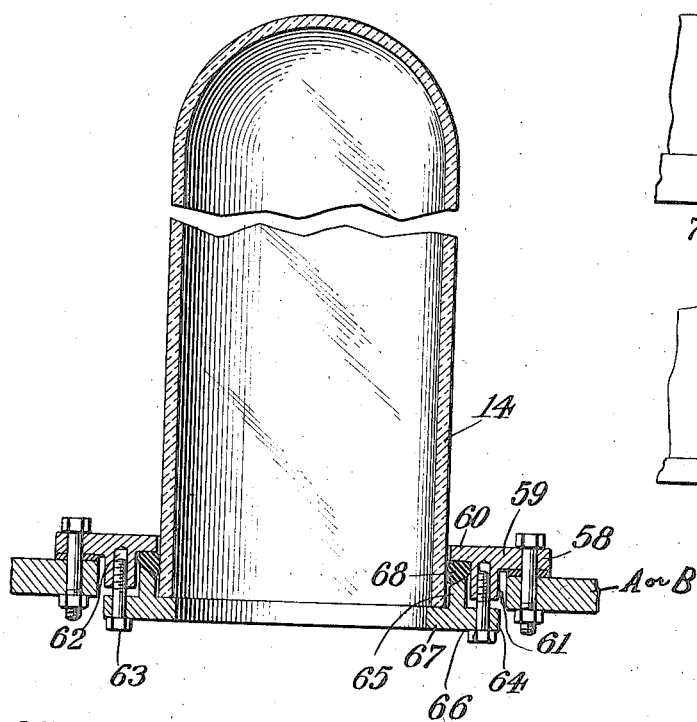
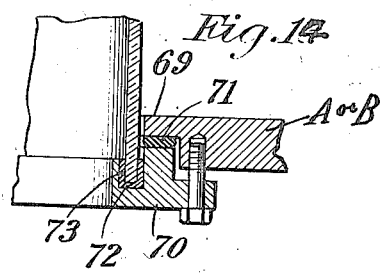
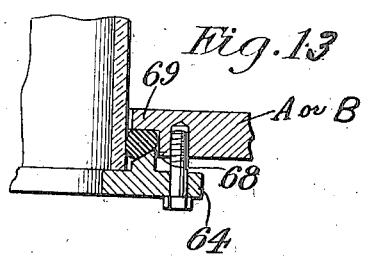

UNITED STATES PATENT OFFICE.

MAX von RECKLINGHAUSEN, OF PARIS, FRANCE, ASSIGNOR TO THE R. U. V. COMPANY, OF NEW YORK, N. Y., A CORPORATION OF NEW YORK.

APPARATUS FOR THE STERILIZATION OF LIQUIDS BY ULTRA-VIOLET RAYS.

1,190,609. Specification of Letters Patent. Patented July 11, 1916.

Application filed January 15, 1914. Serial No. 812,173.

*To all whom it may concern:*

Be it known that I, MAX VON RECKLINGHAUSEN, a subject of the Emperor of Germany, residing at Paris, France, have invented certain new and useful Improvements in Apparatus for the Sterilization of Liquids by Ultra-Violet Rays, of which the following is a full, clear, and exact description.

The invention which constitutes the subject matter of this application relates to devices for the union of the lamp boxes and electrical accessories used in the sterilization of liquids, so that they form one part of the sterilization chamber or else are suitably secured to the wall of the sterilization tank.

In the various modifications described hereinafter, the lamp chamber is so arranged that in case of a break of the protecting quartz tube the water will not come in contact with the electric accessories. In case the lamp box is hermetically closed, there must be provided a siphon, sealed with a proper fluid, or equivalent means, to allow the escape of the water from the lamp chamber.

Figure 1:
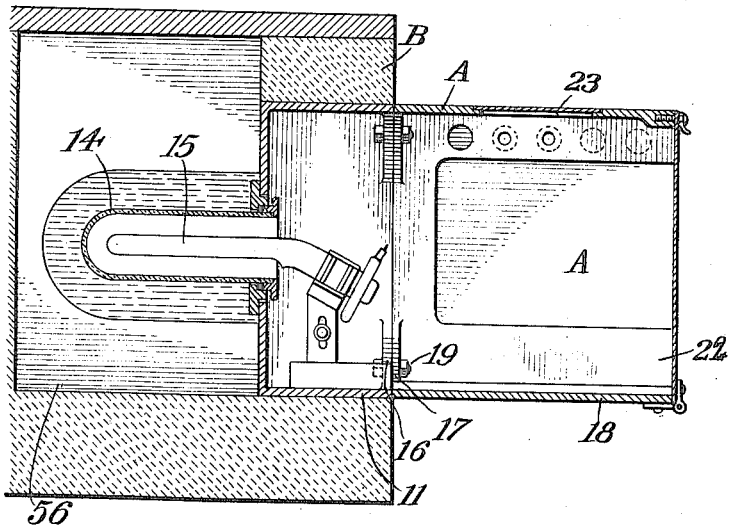
Figure 2:
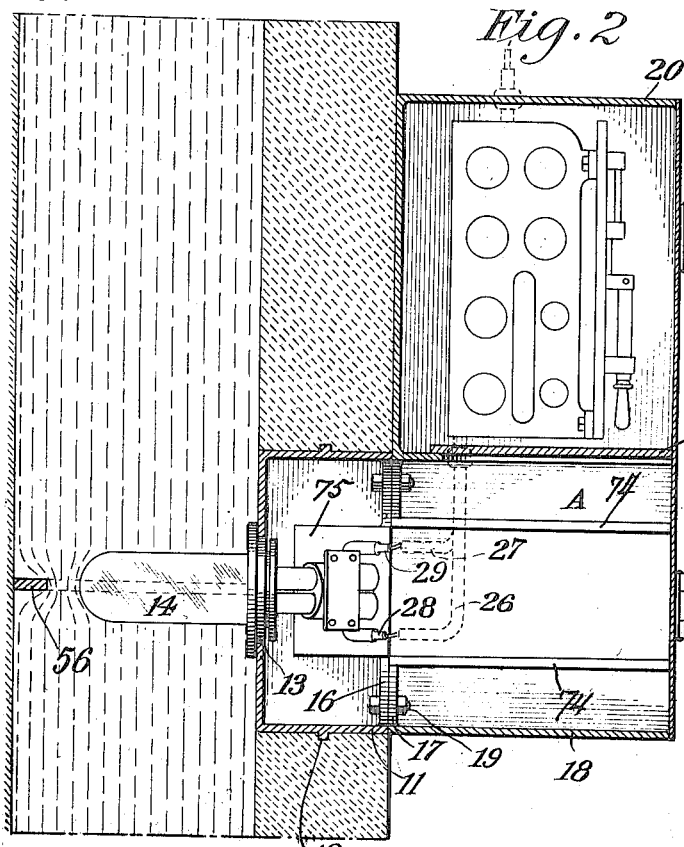
Figure 3:
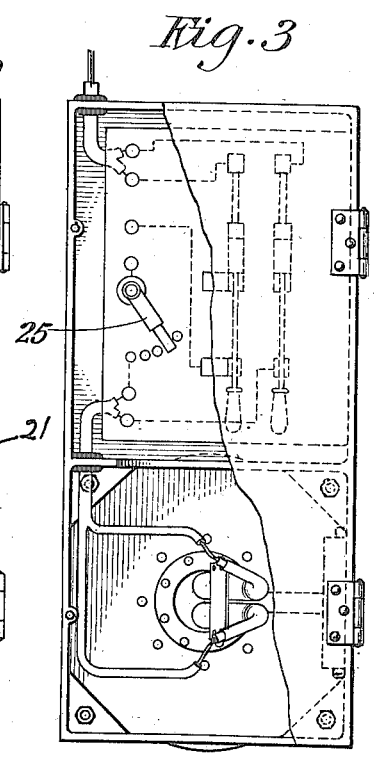
Figure 8:
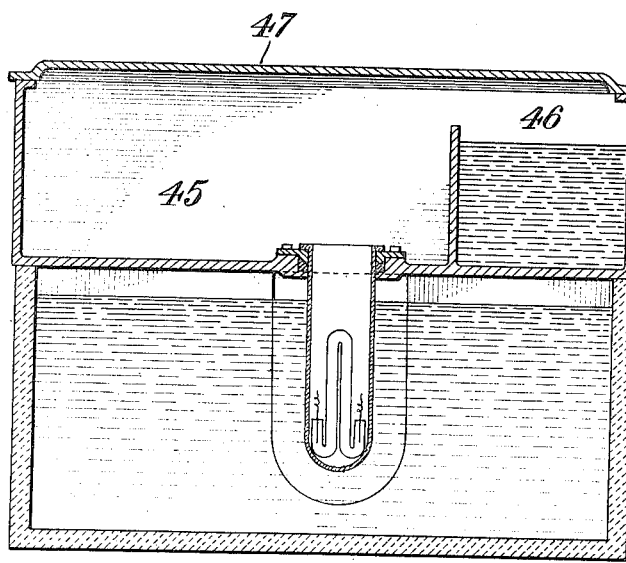
Figure 9:
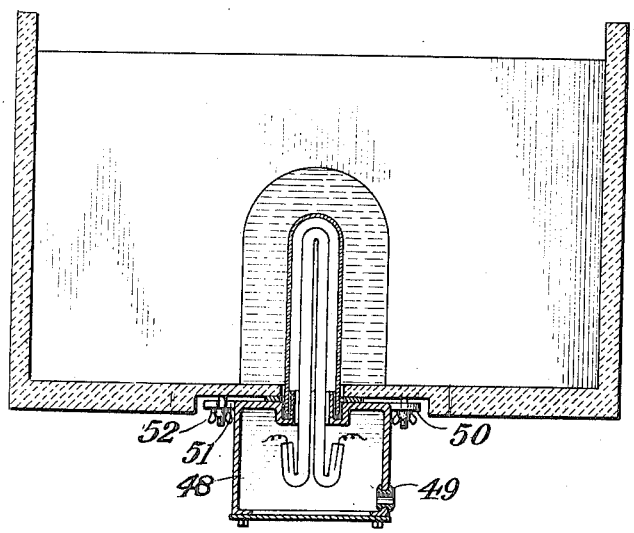

In the drawings, Figure 1 illustrates a part of a cross section of a sterilization tank or conduit and a cross sectional view of the accessory box secured thereto. Fig. 2 is a central longitudinal section of the device shown in Fig. 1. Fig. 3 is a front view of the accessory box with the door partly broken away to show the interior construction, the bottom being where the hinges are shown. Fig. 4 is a vertical longitudinal section of a modified form of accessory box. Fig. 5 is a front view of the same with the closure in normal position. Fig. 6 illustrates another form similar to the form shown in Fig. 4, especially adapted for a vertical alternating current lamp. Fig. 7 is a side view of the form shown in Fig. 6. Fig. 8 shows the accessory box located above the sterilizing tank with the quartz tube suspended from the said box into said tank. Fig. 9 illustrates a novel form of lamp box, together with novel means of connecting the same preferably to the bottom of the sterilizing tank. Fig. 10 illustrates a form of lamp box and baffle when the former is placed inside the sterilizing tank. Fig. 11 is a central vertical section taken at right angles to the section shown in Fig. 10. Fig. 12 illustrates the preferred way of connecting the quartz tube to the accessory box. Fig. 13 illustrates an alternative method of connecting the quartz container to the accessory box. Fig. 14 is still another method of connecting the quartz container to the accessory box.

In all of the views the character A designates what I prefer to call, for the sake of convenience, the accessory box, while the character B designates a tank, trough or other container or conduit through which the liquid is caused to flow past a suitable source of ultra-violet rays for the purpose of being sterilized.

Referring to Figs. 1 to 3 inclusive, the character 11 designates a member, preferably of rectangular shape, to which the tube 14 and accessory box A may be secured. This securing means is provided particularly when the tank or conduit B is made of concrete, and for securing the same in the concrete to withstand the pressure existing in the tank I employ lugs or equivalent means 12. The member 11 is provided on the inner side with a circular opening 13 to receive the quartz tube 14, into which the ultra-violet ray lamp 15 may be projected. The outer side of the member 10 is provided with a plurality of flanges 16 and corresponding flanges 17 are provided on the lamp box 18 of the accessory box A, and by means of bolts 19 passing through these flanges, the accessory box may be securely fastened to the wall of the sterilizing tank or conduit. Between the resistance box 20 and the lamp box is a partition, the central portion 21 of which is removable, but may be hermetically or otherwise sealed to the other portion 22 so as to exclude liquid from the resistance box in case the quartz tube breaks, which not infrequently occurs. On the upper side of the lamp box, I provide a mica window 23, suitably connected in position, and either transparent or translucent, or both, so as to ascertain visibly whether or not the lamp is in operation. The front of the accessory box is provided with resistance boxes, and with the latter is employed any well known resistance means indicated at 25. The portion 22 of the partition is provided at the upper side thereof with a plurality of perforations to receive the leads 26 and 27 from the resistance box, and these leads are connected, of course to the electrodes 28 and 29. The lamp chamber is provided with suitable guides 74 whereby the lamp support 75 and lamp 15 may be properly moved into and out of operative position without danger of breaking the said lamp or the quartz tube 14 in which said lamp is contained.

In Figs. 4 and 5 I illustrate a slightly modified form of the device, which contains a rheostat chamber 30, a lamp chamber 31, and an oil chamber 32, for high tension accessories with perforations 33 and 34, respectively, in the partitions 35 and 36. The accessory box in this case is secured directly to the outer surface of the sterilizing unit, by tight joint to prevent leakage. The oil chamber 32 is provided with a removable closure 37. It may be remarked that in case the quartz tube should break, some means must be provided to drain the water from the lamp box and to do this I employ a trap 40, and while the same may be desirable in all the constructions illustrated, I only show it in Figs. 5 and 6.

Figs. 6 and 7 illustrate a form especially adapted for an alternating current lamp, and in which the lamp is vertically arranged. This form comprises the two chambers 41 and 42 between which is a removable partition 43, provided with one or more perforations therein for the conducting wires and an oil chamber 44 located above the aforesaid chambers.

In Fig. 8 I show an arrangement in which the lamp is placed in a depending or hanging quartz tube; that is to say the accessory box is located above the sterilizing tank or conduit. Two or more chambers 45 and 46 are employed, which have, preferably, a common closure 47.

In Fig. 9 the numeral 48 designates a lamp chamber preferably cylindrical in shape and to which the quartz tube is connected and in which the usual vapor lamp is located. In one side of this box there is located a perforation 49 for the leads. Preferably on the opposite sides of the lamp chamber flanges 50 are provided, the slots 51 of which, and the thumb-screws 52, constitute a slot and screw connection between the lamp chamber and the sterilizing tank.

In Figs. 10 and 11 the numeral 53 designates a lamp chamber which is located upon the interior of the sterilizing tank and preferably in a depression 54 in the tank conforming in outline to the outline of the lower end of the lamp chamber. If desired, the lamp may, of course, be secured to the tank. The leads passing from the lamp chamber are indicated at 55 extending upwardly to a convenient switch, not shown. Owing to the configuration of the lamp chamber, there are shadows cast by the lamp, and in order to cause the liquid to flow through illuminated spots only, I employ a baffle 56 having a central restricted opening 57 through which the liquid is forced to pass, whereby all the molecules are subjected to the ultra-violets rays emitted from the lamp. This baffle is employed in all the modifications illustrated for a further purpose, to wit, to cause a thorough agitation of the liquid as it flows by the source of rays.

In Fig. 12 I show the preferred method of connecting the quartz tube 14 to the accessory box A. Secured directly to the latter is an annular member 58, the internal diameter of which is slightly greater than the external diameter of the quartz tube 14. This member in cross section is in the form of a T, the cross being indicated at 59 and 60, and the leg portions at 61, the latter having a plurality of screw threaded holes 62 therein, which are adapted to receive the screw-threaded securing members 63, the latter in turn adapted to hold the annular member 64 in position. This annular member is also T-shaped in cross section, the leg of the T being indicated at 65 and the cross portions at 66 and 67. The leg is beveled at the upper portion, as shown, and telescopes with the annular leg portion 61 of member 58. Located between the beveled portions of the leg 65 and the portion 60 of the member 58 is an annular gasket 68. By the act of screwing the bolts 63, the gasket is compressed and causes the same to become smaller in diameter, as will be obvious, and thereby firmly engages the quartz tube. This engagement is sufficient to hold the quartz tube in place where there is either little or no pressure in the sterilizing tank. When there is some pressure, however, in the tank, the quartz tube cannot be gripped sufficiently to withstand this pressure, owing to its extreme delicacy. Furthermore, as a matter of economical operation, this liability to breakage must be reduced to a minimum, on account of the expensiveness of the quartz tube. To do this the annular flange 67 is located in the path of the end of the quartz tube and upon which the latter normally rests to withstand the pressure existing in the tank. The clamping ring 58 serves to furnish a replaceable element in case of accident.

In Fig. 13 I illustrate a modified form of the arrangement shown in Fig. 12. In this case the member 58 is entirely omitted, and the member 64 connected directly to the box A. In Fig. 12 the leg 61 serves to confine the gasket. In Fig. 13 this function is performed by the shoulder 68 and, of course, the part 69 of the tank wall performs the same function as the flange 60 of Fig. 12.

Fig. 14 illustrates a still further modification of the connection between the quartz tube and the accessory box. Between the annular flange 69 and clamping ring 70 is a gasket or packing ring 71. The flange 70 is provided with a groove 72 into which the open end of the quartz tube is adapted to rest, and when the latter is placed in position it is preferably cemented therein, the cementitious material being indicated at 73.

What I claim is:—

1. In a device of the kind described, a sterilizing unit of concrete or masonry through which a liquid is adapted to flow, a metallic securing member embedded in said concrete or masonry, in combination with an accessory box, comprising a plurality of chambers, a lamp, switch board and other electrical accessories therein, means for securing said accessory box to said embedded member, an ultra-violet ray lamp projecting into said unit, and means for removably securing said lamp to said embedded metallic member.

2. A device for sterilizing liquids, comprising a tank through which the liquid is adapted to flow and provided with a perforation in one side thereof, an accessory box located upon the exterior of the said tank and provided with a plurality of chambers, a lamp capable of emitting ultra-violet rays located in a quartz tube, which is secured to said box and projects through said perforation to the interior of said tank, said lamp being slidably mounted in said accessory box whereby the same is adapted to be moved into and out of said quartz tube and means for securing said box to said tank.

3. A device for sterilizing liquids by ultra-violet rays, comprising, in combination, a tank through which the liquid is adapted to flow and provided with a perforation in one side thereof, an accessory box located upon the exterior and provided with a plurality of separate hermetically sealed chambers, a closure common to two of said chambers to afford access thereto, a lamp capable of emitting ultra-violet rays located in a quartz tube, which is secured to said box and projects through said perforation to the interior of said tank, and means for securing said box to said tank.

4. A device for sterilizing liquid, by ultra-violet rays, comprising, in combination, a tank through which the liquid is adapted to flow and provided with a perforation in one side thereof, an accessory box located upon the exterior of said tank and divided by perforated partitions into a plurality of separate chambers, a lamp capable of emitting ultra-violet rays located in a quartz tube which is secured to said box and projects through said perforation to the interior of said box, and means consisting of a removable closure for affording access to said lamp.

5. In a device of the class described, a sterilizing unit through which a liquid is adapted to flow, in combination with an accessory box connected to said unit and having a quartz container projecting into said unit, a lamp movable into and out of the quartz container, regulating devices to control the flow of current to said lamp, said devices being located within the accessory box, and a dividing partition to prevent the liquid reaching said regulating devices upon the breakage of the quartz container.

In testimony whereof I affix my signature in the presence of two subscribing witnesses.

MAX von RECKLINGHAUSEN.

Witnesses:
WM. BOHLEBER,
JOHN J. BULLEID.